United States Patent
Dageville et al.

(10) Patent No.: US 10,545,917 B2
(45) Date of Patent: Jan. 28, 2020

(54) MULTI-RANGE AND RUNTIME PRUNING

(71) Applicant: Snowflake Inc., San Mateo, CA (US)

(72) Inventors: Benoit Dageville, Foster City, CA (US); Thierry Cruanes, San Mateo, CA (US); Marcin Zukowski, San Mateo, CA (US); Allison Waingold Lee, San Carlos, CA (US); Philipp Thomas Unterbrunner, Belmont, CA (US)

(73) Assignee: Snowflake Inc., San Mateo, CA (US)

( * ) Notice: Subject to any disclaimer, the term of this patent is extended or adjusted under 35 U.S.C. 154(b) by 446 days.

(21) Appl. No.: 14/882,024

(22) Filed: Oct. 13, 2015

(65) Prior Publication Data

US 2016/0034486 A1 Feb. 4, 2016

Related U.S. Application Data

(63) Continuation-in-part of application No. 14/518,884, filed on Oct. 20, 2014.

(60) Provisional application No. 61/941,986, filed on Feb. 19, 2014.

(51) Int. Cl.
*G06F 16/13* (2019.01)
*G06F 16/22* (2019.01)
*G06F 16/172* (2019.01)
*G06F 16/182* (2019.01)
*G06F 16/2455* (2019.01)

(52) U.S. Cl.
CPC ......... *G06F 16/172* (2019.01); *G06F 16/137* (2019.01); *G06F 16/1827* (2019.01); *G06F 16/2237* (2019.01); *G06F 16/2255* (2019.01); *G06F 16/2456* (2019.01)

(58) Field of Classification Search
CPC .......................... G06F 17/302; G06F 17/3033
USPC .................................................. 709/203, 213
See application file for complete search history.

(56) References Cited

U.S. PATENT DOCUMENTS

| | | | |
|---|---|---|---|
| 5,787,466 A | 6/1998 | Berliner | |
| 6,490,590 B1 | 12/2002 | Fink | |
| 6,757,689 B2 | 6/2004 | Battas | |
| 7,280,998 B1 | 10/2007 | Aboujaoude | |
| 7,738,454 B1 * | 6/2010 | Panwar | H04L 45/745 370/389 |
| 7,823,009 B1 | 10/2010 | Tormasov | |
| 8,290,972 B1 * | 10/2012 | Deshmukh | G06F 16/24556 707/758 |

(Continued)

FOREIGN PATENT DOCUMENTS

| | | |
|---|---|---|
| CN | 102496060 | 6/2012 |
| CN | 203261358 | 10/2013 |

(Continued)

OTHER PUBLICATIONS

Azza Abouzeid et al, "HadoopDB", Proceedings of the VLDB Endowment, ACM Digital Library, Assoc. of Computing Machinery, New York, NY, vol. 2, No. 1, Aug. 2009.

*Primary Examiner* — Minh Chau Nguyen
(74) *Attorney, Agent, or Firm* — Womble Bond Dickinson (US) LLP; Daniel E. Ovanezian

(57) ABSTRACT

A system, apparatus, and method for managing data storage and data access with querying data and filtering value ranges using only a constant amount of computer memory in the implementation of bloom filters based on a first consumption of a relation.

26 Claims, 6 Drawing Sheets

(56) References Cited

U.S. PATENT DOCUMENTS

| | | | |
|---|---|---|---|
| 8,301,650 B1* | 10/2012 | Oliver | G06F 17/30949 707/758 |
| 8,341,363 B2 | 12/2012 | Chou | |
| 8,381,015 B2 | 2/2013 | Kaminski | |
| 8,428,087 B1 | 4/2013 | Vincent | |
| 8,516,159 B2 | 8/2013 | Ananthanarayanan | |
| 8,516,355 B2 | 8/2013 | Gale | |
| 8,560,887 B2 | 10/2013 | Behrendt | |
| 8,640,137 B1 | 1/2014 | Bostic et al. | |
| 8,706,914 B2 | 4/2014 | Duchesneau | |
| 8,725,875 B2 | 5/2014 | Supalov | |
| 9,740,797 B2* | 8/2017 | Nyang | G06F 17/3033 |
| 2002/0120630 A1 | 8/2002 | Christianson et al. | |
| 2003/0158884 A1 | 8/2003 | Alford, Jr. | |
| 2003/0177239 A1 | 9/2003 | Shinohara et al. | |
| 2004/0039729 A1* | 2/2004 | Boger | G06F 16/24552 707/999.002 |
| 2004/0167904 A1 | 8/2004 | Wen et al. | |
| 2005/0021758 A1* | 1/2005 | White | H04L 67/16 709/226 |
| 2005/0210049 A1 | 9/2005 | Foster | |
| 2006/0059173 A1 | 3/2006 | Hirsch et al. | |
| 2006/0074872 A1 | 4/2006 | Gordon | |
| 2007/0198656 A1 | 8/2007 | Mazzaferri et al. | |
| 2007/0276861 A1 | 11/2007 | Pryce et al. | |
| 2008/0027788 A1 | 1/2008 | Lawrence et al. | |
| 2008/0027965 A1 | 1/2008 | Garret et al. | |
| 2009/0043993 A1* | 2/2009 | Ford | G06F 11/30 712/216 |
| 2009/0182836 A1 | 7/2009 | Aviles et al. | |
| 2009/0216910 A1* | 8/2009 | Duchesneau | G06F 9/5072 709/250 |
| 2009/0254516 A1 | 10/2009 | Meiyyappan et al. | |
| 2009/0254532 A1 | 10/2009 | Yang et al. | |
| 2009/0300043 A1 | 12/2009 | Maclennan | |
| 2010/0005054 A1 | 1/2010 | Smith et al. | |
| 2010/0031267 A1 | 2/2010 | Maessen et al. | |
| 2010/0082648 A1* | 4/2010 | Potapov | G06F 3/0611 707/756 |
| 2010/0100888 A1 | 4/2010 | Tene et al. | |
| 2010/0145929 A1 | 6/2010 | Burger | |
| 2010/0179940 A1 | 7/2010 | Gilder et al. | |
| 2010/0199042 A1 | 8/2010 | Bates | |
| 2011/0145307 A1 | 6/2011 | Ananthanarayanan et al. | |
| 2011/0161488 A1 | 6/2011 | Anderson et al. | |
| 2011/0225167 A1 | 9/2011 | Bhattacharjee et al. | |
| 2011/0246503 A1* | 10/2011 | Bender | G06F 17/30306 707/769 |
| 2012/0005307 A1 | 1/2012 | Das et al. | |
| 2012/0101860 A1 | 4/2012 | Ezzat | |
| 2012/0109888 A1 | 5/2012 | Zhang et al. | |
| 2012/0110570 A1 | 5/2012 | Jacobson | |
| 2012/0166771 A1 | 6/2012 | Ringseth | |
| 2012/0173824 A1 | 7/2012 | Iyigun et al. | |
| 2012/0204187 A1 | 8/2012 | Breiter et al. | |
| 2012/0233315 A1 | 9/2012 | Hoffman | |
| 2012/0260050 A1 | 10/2012 | Kaliannan | |
| 2012/0265881 A1 | 10/2012 | Chen | |
| 2012/0294307 A1* | 11/2012 | Fujihira | H04L 45/7453 370/389 |
| 2012/0296883 A1 | 11/2012 | Ganesh et al. | |
| 2012/0311065 A1 | 12/2012 | Ananthanarayanan et al. | |
| 2012/0323971 A1 | 12/2012 | Pasupuleti | |
| 2013/0007753 A1 | 1/2013 | Jain | |
| 2013/0031229 A1* | 1/2013 | Shiga | G06F 17/3033 709/223 |
| 2013/0124545 A1 | 4/2013 | Holmberg et al. | |
| 2013/0110778 A1 | 5/2013 | Taylor et al. | |
| 2013/0110961 A1 | 5/2013 | Jadhav | |
| 2013/0132967 A1 | 5/2013 | Soundararajan | |
| 2013/0145375 A1 | 6/2013 | Kang | |
| 2013/0151884 A1 | 6/2013 | Hsu | |
| 2013/0174146 A1 | 7/2013 | Dasgupta | |
| 2013/0205028 A1 | 8/2013 | Crockett et al. | |
| 2013/0205092 A1 | 8/2013 | Roy et al. | |
| 2013/0218837 A1 | 8/2013 | Bhatnagar | |
| 2013/0282795 A1 | 10/2013 | Tsao | |
| 2013/0332614 A1 | 12/2013 | Brunk | |
| 2014/0025638 A1 | 1/2014 | Hu | |
| 2014/0059226 A1 | 2/2014 | Messerli | |
| 2014/0095646 A1 | 4/2014 | Chan | |
| 2014/0109095 A1 | 4/2014 | Farkash | |
| 2014/0115091 A1 | 4/2014 | Lee | |
| 2014/0136473 A1 | 5/2014 | Faerber | |
| 2014/0149461 A1 | 5/2014 | Wijayaratne | |
| 2014/0222975 A1* | 8/2014 | Vasseur | H04L 41/142 709/220 |
| 2015/0088903 A1 | 3/2015 | Konik | |
| 2015/0088924 A1 | 3/2015 | Abadi | |
| 2016/0224685 A1* | 8/2016 | Nyang | G06F 17/3033 |

FOREIGN PATENT DOCUMENTS

| | | |
|---|---|---|
| WO | WO 2006-026659 | 3/2006 |
| WO | WO 2013-006157 | 1/2013 |
| WO | WO2013072232 | 5/2013 |
| WO | WO2013084078 | 6/2013 |

* cited by examiner

MULTI-RANGE AND RUNTIME PRUNING

CROSS REFERENCE TO RELATED APPLICATIONS

This application is a Continuation in Part of U.S. application Ser. No. 14/518,884, entitled "Resource Management Systems And Methods," filed Oct. 20, 2014, which also claims the benefit of U.S. Provisional Application Ser. No. 61/941,986, entitled "Apparatus and method for enterprise data warehouse data processing on cloud infrastructure," filed Feb. 19, 2014, the disclosures of which are incorporated herein by reference in their entirety.

TECHNICAL FIELD

The present disclosure relates to resource management systems and methods that manage data storage and computing resources.

BACKGROUND

Many existing data storage and retrieval systems are available today. For example, in a shared-disk system, all data is stored on a shared storage device that is accessible from all of the processing nodes in a data cluster. In this type of system, all data changes are written to the shared storage device to ensure that all processing nodes in the data cluster access a consistent version of the data. As the number of processing nodes increases in a shared-disk system, the shared storage device (and the communication links between the processing nodes and the shared storage device) becomes a bottleneck that slows data read and data write operations. This bottleneck is further aggravated with the addition of more processing nodes. Thus, existing shared-disk systems have limited scalability due to this bottleneck problem.

Another existing data storage and retrieval system is referred to as a "shared-nothing architecture." In this architecture, data is distributed across multiple processing nodes such that each node stores a subset of the data in the entire database. When a new processing node is added or removed, the shared-nothing architecture must rearrange data across the multiple processing nodes. This rearrangement of data can be time-consuming and disruptive to data read and write operations executed during the data rearrangement. And, the affinity of data to a particular node can create "hot spots" on the data cluster for popular data. Further, since each processing node performs also the storage function, this architecture requires at least one processing node to store data. Thus, the shared-nothing architecture fails to store data if all processing nodes are removed. Additionally, management of data in a shared-nothing architecture is complex due to the distribution of data across many different processing nodes.

The systems and methods described herein provide an improved approach to data storage and data retrieval that alleviates the above-identified limitations of existing systems.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1B:
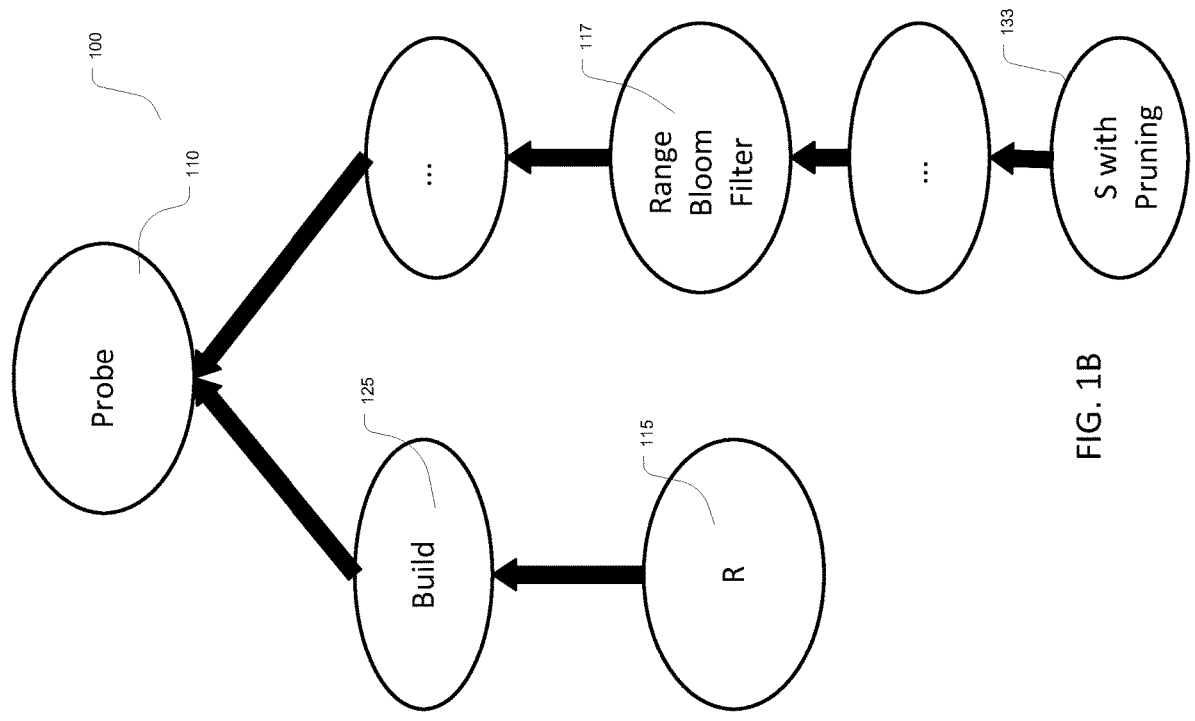
FIG. 1B is an information flow diagram illustrating an implementation of the methods in accordance with the teachings of this disclosure.

Disclosed herein are systems and methods for managing data storage and data access with querying data and filtering value ranges using only a constant amount of computer memory in the implementation of bloom filters based on a first consumption of a relation. For example, an implementation may consume an input relation via a build operator wherein the build operator maintains an initially empty range bloom vector in computer memory, and then add entries for each input data set of the input relation that the build operator consumes to the range bloom vector to form a final range bloom vector. It will be appreciated that the term "consume" means to "read and process," where "process" can be any kind of data transformation, such as building a hash table or building a 'RangeBloomvec' data structure, for example. Additionally, each entry of the final range bloom vector may hold a minimum and maximum value pair which describes a range of values present in the input data set of the input relation, and after the input relation has been consumed, broadcast the final range bloom vector to other probe operator instances. Furthermore, each of the probe operator instances may merge their corresponding final range bloom vectors into a single merged range bloom vector such that after the merge every probe operator instance may hold at least substantially similar or identical copy of the merged range bloom vector. Finally, filtering input rows of secondary relations locally with the merged range bloom vector.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example" or "an example" means that a particular feature, structure or characteristic described in connection with the embodiment or example is included in at least one embodiment of the present disclosure. Thus, appearances of the phrases "in one embodiment," "in an embodiment," "one example" or "an example" in various places throughout this specification are not necessarily all referring to the same embodiment or example. Furthermore, the particular features, structures, databases or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method or computer program product. Accordingly, the present disclosure may take the form of an entirely hardware-comprised embodiment, an entirely software-comprised embodiment (including firmware, resident software, micro-code, etc.) or an embodiment combining software and hardware aspects that may all generally be referred to herein as a "circuit," "module" or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein provide a flexible and scalable data warehouse using a new data processing platform. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

In the described systems and methods, a data storage system utilizes an SQL (Structured Query Language)-based relational database. However, these systems and methods are applicable to any type of database using any data storage architecture and using any language to store and retrieve data within the database. The systems and methods described herein further provide a multi-tenant system that supports isolation of computing resources and data between different customers/clients and between different users within the same customer/client.

In data management, data within a relational database may be manipulated in order to make it useful and to derive information. Other times data from a plurality of relational databases maybe compared and/or joined to make it more useable. For example, a relational join is one of the fundamental data processing operations in a relational data management system. A join is a binary operator, taking two relations R and S, and a binary predicate θ as inputs, and producing a single relation R[?]$_θ$ S which contains the set of all combinations of tuples in R and S which satisfy the predicate θ.

A single query typically performs multiple such joins, resulting in tree-shaped execution plans. Joins form intermediate nodes of that tree, and base relations from leaves of that tree. Data flows from the leaves of the tree towards the root, where the final query result is produced. The execution time of a query is directly related to the amount of intermediate data it produces. Relational data management systems thus seek to minimize the amount of intermediate data which flows through the tree in order to minimize the execution time of the query.

This invention regards a method for pushing parts of join predicates from their original join node further down the tree, possibly all the way down to the leaf nodes, where the predicates serve as filters which reduce the amount of intermediate data flowing through the execution tree.

When applied to individual rows this technique is generally referred to as "filtering". When applied to entire chunks of input data (blocks, pages, files) this technique is typically called "pruning."

For example an equijoin having a join predicate θ of the join R [?]θ S that contains some equality predicate α=β where a is some set of attributes of R and β is some set of compatible attributes of S. In other words R [?]θ S is a so-called equijoin 1. An existing technique is to have the join first consume one full input relation R, hash the attributes a of each input row r in R, and construct a bit vector based on the computed hash values. This bit vector is then pushed down the sub-expression (i.e. sub-tree) that produces S, where it can be used to filter the input before it even reaches the join at the probe operation. This technique has been implemented in many of the major relational data management products and is called "bloom filters" or "bloom join", also called "bit vectors" in very early work.

A generalization of this idea is to not only keep bits, but to keep the original values of attributes a up to some maximum number of values. This set of values essentially becomes an "IN" predicate. Only rows of S whose values of β are in the value set pass the filter. Both the bit vector and the value set technique are naturally restricted to equality predicates. But many real-world queries have non-equality join predicates, such as range predicates over date columns.

It is possible to dynamically construct and push range predicates, by keeping a running minimum and maximum of α, and, after R has been fully consumed, pushing this pair of minimum-maximum values into a range predicate on S. Only values of β which fall into the range pass the filter.

The big restriction of the latter technique is that it only maintains a single range of values. Thus, it can result in very poor filtering ratios if relation R contains outliers causing the range to become very large.

The invention consists of a novel data structure called "range bloom vector" and related filtering and pruning methods called "range bloom filtering" and "range bloom pruning" respectively.

As used herein the term "build operator" is intended to denote an operator that builds a hash table as part of a hash operation. Additionally, the term "probe operator" is intended to denote an operator that reads inner streams of data and probes a hash table to find matching rows as part of a hash operation. The range bloom vector data structure is independent of parallel processing however, and it will be appreciated by those skilled in the art that range bloom vectors are also useful in a non-parallel, single-machine implementation of relational joins, where the distinction between "build operator" and "probe operator" may serve no purpose.

It will be appreciated that a "bloom filter" is a space-efficient probabilistic data structure that is used to test whether an element is a member of a set. False positive matches are possible, but false negatives are not. Thus, a bloom filter has a 100% recall rate. In other words, a query returns either "possibly in set" or "definitely not in set" result.

An empty bloom filter is a bit array of m bits, all set to 0. There must also be k different hash functions defined, each of which maps or hashes some set element to one of the m array positions with a uniform random distribution. To add an element, it is fed to each of the k hash functions to get k array positions. Set the bits at all these positions to 1. To query for an element (test whether it is in the set), it may be fed to each of the k hash functions to get k array positions. If any of the bits at these positions is 0, the element is definitely not in the set. Conversely, if it were in the set, then all the bits would have been set to 1 when it was inserted. If all are 1, then either the element is in the set, or the bits have by chance been set to 1 during the insertion of other elements, resulting in a false positive.

Figure 1A:
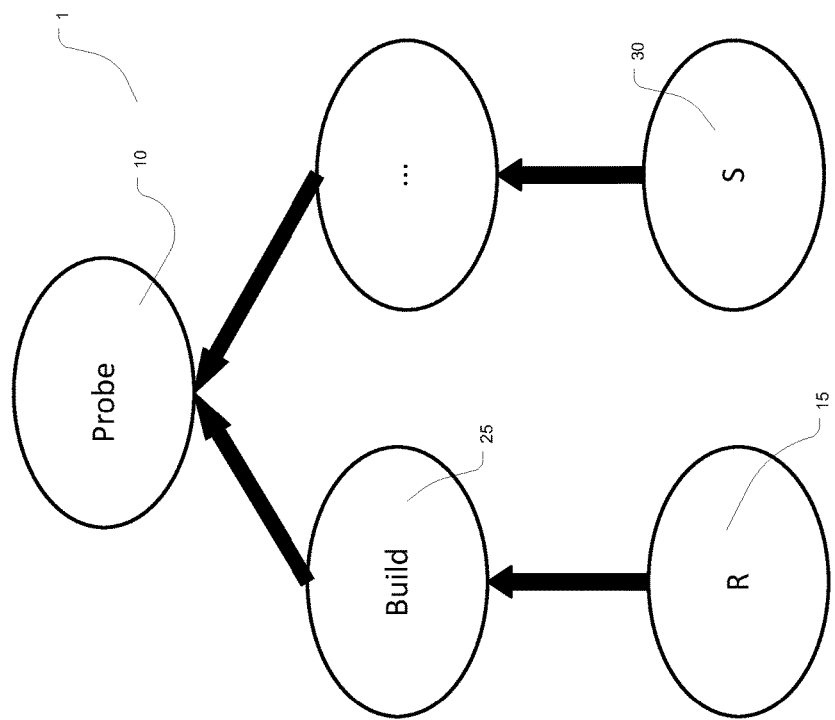
FIG. 1A is an information flow diagram depicting a prior art equijoin process.

FIG. 1A and FIG. 1B illustrate two generic query plans for a join R [?]θ S. FIG. 1A illustrates a traditional query plan 1 for a join of relation R 15 and relation S 30 without range bloom filtering and range bloom pruning. The join implementation is split into two operators: Build 25 and Probe 10. The build operator 25 dynamically chooses the join distribution method, typically either a partition-wise join or a broadcast join. The probe operator 25 computes the actual, local joins using one of the well-known techniques such as hash join, merge join, nested loops join.

FIG. 1B illustrates a new and improved query plan 100 for a join of relation R 115 and pruned relation S 133 with range bloom filtering 117 and range bloom pruning enabled. The join implementation is split into two operators: Build 125 and Probe 110. Here, each instance of the build operator 125 is also responsible for constructing a range bloom vector, which is then pushed down the right side of the plan in order to filter input rows early. In an implementation, each operator in a tree can have many instances, which are executed in parallel, across multiple processors of one machine, or across multiple machines connected by a computer network.

It is important to understand, that each Build operator instance, call it i, creates a range bloom vector that only covers the partition of R that i had seen. All of these range bloom vectors may be merged before they may be used for pruning.

Figure 2:
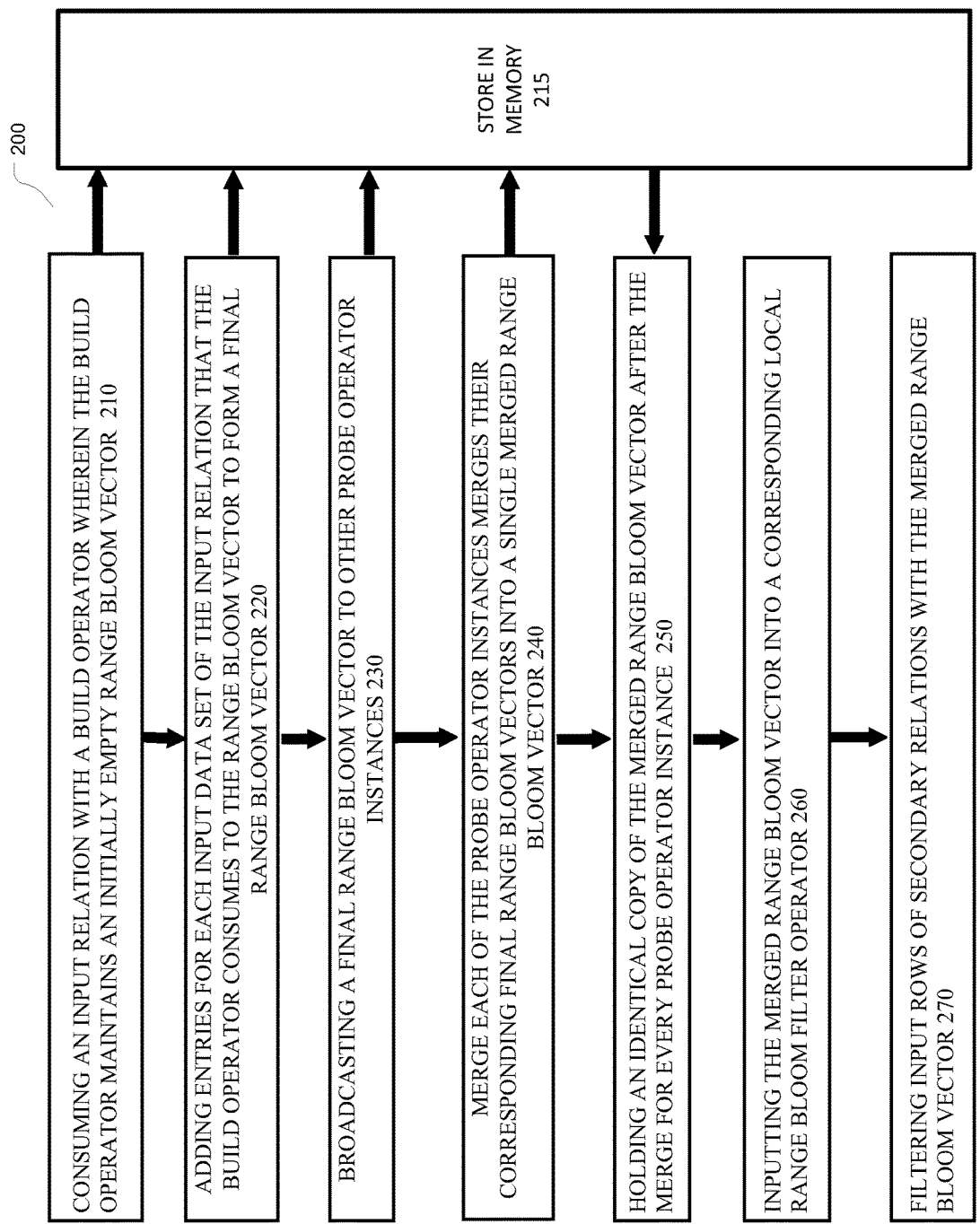
FIG. 2 is a process flow diagram depicting an implementation of the methods disclosed herein.

Illustrated in FIG. 2 illustrates a block diagram of an implementation for querying data and filtering value ranges using only a constant amount of computer memory by using bloom filters. In an implementation of how range bloom vectors are created and used during execution a computing system may comprise a build operator that consumes its input relation. At 210 each build operator instance may maintain an initially empty range bloom vector and may store it in computer cache memory at 215. At 220 each input row a build operator instance sees is added to its range bloom vector and stores it in computer cache memory at 215.

Once R has been fully consumed, each build operator instance may broadcast its final range bloom vector to all probe operator instances at 230 which may then be stored in computer memory at 215.

At 240 each probe operator instance may merge the range bloom vectors it receives into a single range bloom vector that may be then stored in computer cache memory at 215.

At the end of this merge, every probe operator instance may hold an identical copy of this merged range bloom vector at 250 that may be accessed from computer cache memory for filtering and pruning at 215.

At 260 each probe operator instance may plug its merged range bloom vector into its local range bloom filter operator. In an implementation, the instances may be additionally or alternatively input into the local access path (117 of FIG. 1B) to S the execution plan.

At 270 the range bloom filter may use the range bloom vector for filtering, and the access path may use the range bloom vector pruning entire blocks/pages/files based on known minimum/maximum values of the respective block/page/file. Finally, S is consumed and the range bloom vector is used to prune and filter input rows. An access path is database terminology for any leaf operator that accesses a base relation. In an implementation, an access path may be a "sequential scan" (linear read of all the blocks/pages/files of the input relation from memory or disk), or something more structured, such as a B-Tree index.

For pruning, the minimum-maximum values can be stored in the block/page/file headers or outside of the block/page/file (in some meta-data store). Blocks/pages/files whose value range(s) do not overlap with the value range(s) stored in the range bloom filter are pruned; that is, they are not accessed at all.

The range bloom vector data structure is an integral part of the invention. It is a novel method for gathering and querying information on value ranges using only a constant amount of memory. In short, the range bloom vector is a bounded-size hash map (the default is 64 entries), where each entry holds a minimum-maximum value pair which describes a range of values present in the input data set. The ranges of individual hash map entries are disjunct. A specific value in each range is chosen as the key of the hash map entry for purposes of hashing.

For any given input value, there is a simple function which maps the input value to exactly one hash key. If there is a range in the range bloom vector which contains the input value, then the range bloom vector's hash map will contain an entry for the respective key, and the range of that entry will encompass the input value.

The range bloom vector data structure contains the following, here described in C++ style pseudo-code.

```
template <typename T>
struct Entry {
    T min; // lower, inclusive boundary of range
    T max; // upper, inclusive boundary of range
};
template <typename T>
struct RangeBloomvec {
    int shift;
    size_t capacity;
    HashMap<T, Entry<T> >entries;
};
```

The capacity field contains the maximum number of entries the range bloom vector may have. The shift field contains how many times the range bloom vector has been shifted (described below). The initial shift is 0. The entries field is a hash map which maps keys of type T to an Entry<T>.

Inserting a new value into the range bloom vector works as follows, specified in C++:

```
template <typename T>
void insert(RangeBloomvec<T> &rbv, T value) {
    T key = value >> rbv.shift;
    if (rbv.entries.contains(key)) {
        // Entry already exists. Add value to range.
        Entry &entry = rbv.entries[key];
        entry.min = min(entry.min, value);
        entry.max = max(entry.max, value);
    } else if (rbv.entries.size( ) < rbv.capacity) {
        //Entry does not exist. Have spare capacity. Create new entry.
        Entry newEntry = {value, value };
        rbv.entries.insert(value, newEntry);
    } else {
        // Entry does not exist. Out of capacity. Shift and retry.
        shift(rbv);
        insert(rbv, value);
    }
}
template <typename T>
void shift(RangeBloomvec<T> &rbv) {
    ++rbv.shift;
    HashMap<T, Entry<T> >newEntries;
    for (pair<T, Entry<T> > &old : rbv.entries) {
        T newKey = oldfirst >> 1;
        if (newEntries.contains(newKey)) {
            // Entry for this key already exists. Merge.
            Entry<T> &newEntry = rbv.entries[newKey];
            newEntry.min = min(newEntry.min, old.second.min);
            newEntry.max = max(newEntry.max, old.second.max);
        } else {
            // Entry does not exist yet. Create as copy of old entry.
            newEntries.insert(newKey, old.second);
        }
    }
    swap(rbv.entries, newEntries);
}
```

In the implementation, the first line of function insert( ) shows how a value is mapped to a hash key. The system performs a simple bit-shift to the right, where the number of bits is given by the shift field of the range bloom vector data structure. Initially shift is 0, so any value maps to itself as the key. Consequently, any entry range initially has size 1 as in it contains just a single value.

Once the size of the entries hash map has reached capacity, the function shift( ) may be called. This function creates a new entry hash map as follows. For each original entry, the function shifts the entry's key by 1 bit to the right. As a result, there may be pairs of entries with the same key. Each such pair of entries is merged into a single entry, simply by computing the single, inclusive range of values that covers the two input ranges.

An implementation for checking whether a value is contained in a range bloom vector is simple and efficient:

```
template <typename T>
bool contains(RangeBloomvec<T> &rbv, T value) {
    T key = value >> rbv.shift;
    if (rbv.entries.contains(key)) {
        // Entry for key exists. Check whether value is in range.
        Entry &entry = rbv.entries[key];
        return (value >= entry.min) && (value <= entry.max);
    } else {
        // No entry for given key. There can be no range that contains
        // the given value.
        return false;
    }
}
```

Note that every time shift( ) is called, the fidelity of range bloom vector decreases, in that the number of distinct keys is halved. Suppose T is a 32-bit integer, then initially there are $2^{32}$ distinct keys. After the first shift, there are $2^{31}$ keys and so forth. As entries and their respective ranges are merged, there will be more and more false positives reported by contains( ). Such is the nature of bloom filters. In an implementation of a merge( ), the range bloom vectors created by multiple Build operator instances may be merged into a single range bloom vector to be used for pruning.

```
template <typename T>
void merge(RangeBloomvec<T> &left, RangeBloomvec<T> &right)
{
    // Both range bloom vectors need to be shifted by the same number
    of bits.
    // This ensures that inserting range boundaries from one range
    bloom vector
    // into the other cannot create disjunct ranges.
    while (left.shift < right.shift)
        shift(left);
```

```
// Insert the range boundaries of the other range bloom vector.
for (Entry<T> &entry : right.entries)
{
  insert(left, entry.min);
  insert(left, entry.max);
}
}
```

The key to range bloom vector's effectiveness is that fidelity decreases gracefully. Every time the capacity is exceeded, only a small number of entries are merged, and merged entries are neighbors on the value domain. This also maintains the invariant that ranges of individual entries are all disjunct. Also, assuming capacity is a power of two, there will never be fewer than capacity distinct keys, because at that point each call to insert( ) will find a matching entry in the hash map. Thus, by choosing the capacity, users can effectively choose a minimum desired fidelity using only a small, bounded amount of memory.

It will be appreciated that the method for gathering and querying information on value ranges uses a constant amount of memory. This may be achieved because the data structure, for example 'RangeBloomvec,' contains nothing but two integer values (shift, capacity) and a hash map containing up to 'capacity' entries. It will be appreciated that 'capacity' is not changed dynamically. It is constant. It is chosen (at the latest) when a 'RangeBloomvec' object is created.

Each entry of type 'Entry<T>', noted above in relation to the range bloom vector data structure, consists of two values of type 'T', which is some fixed-size integer type (for example, 32-bit integer). It will be appreciated that the memory required by a 'RangeBloomvec' is linear in 'capacity'; that is, some multiple of 'capacity'. Users can limit the memory used by the data structure by setting 'capacity'.

In contrast to existing techniques, the invention builds a filter that maintains multiple, disjoint ranges of values. This overcomes the problem of outliers which would otherwise result in a very large single range, and generally improves the accuracy of the filter. For example, in methods and systems that use range-based pruning, if 'capacity' is set to 1, then the data structure degrades into a single (min, max) range. Range-based pruning using a single (min, max) range is distinguishable from the disclosure, where multiple disjunct ranges are used.

The technology utilized by the disclosure may be further distinguished with respect to range-based pruning by the following. First, range-based pruning systems and methods compile time techniques that can only filter on a single (min, max) range. Because they only prune on a single (min, max) range, they potentially fail to prune input data if predicate ranges contain holes. For example, consider the following query:

```
SELECT *
FROM orders
WHERE order_date BETWEEN '01-JAN-2012' and '31-DEC-2012' OR
  order_date BETWEEN '01-JAN-2014' and '31-DEC-2014';
```

In an extreme example, suppose every file/block of table 'orders' contains orders from 2013 but not a single order from 2012 or 2014. Then a range-based pruning system, which prunes only on the single range ('01-JAN-2012', '31-DEC-2014') must look at every single file/block of the table.

In contrast, the technology of the disclosure uses a 'RangeBloomvec' data structure, which can store the two disjunct ranges (e.g., '01-JAN-2012', '31-DEC-2012'), ('01-JAN-2014', '31-DEC-2014') and can thus be used to prune all input files/blocks.

Second, range-based pruning systems can only prune using predicates known at compile time (i.e., part of the query), as in the example above. They fail to prune based on correlations in the data. For example, consider the following query:

```
SELECT *
FROM orders JOIN commercial ON orders.order_date =
  commercial.air_date
WHERE commercial.state ='CA';
```

In this example, suppose that no advertising commercials were aired in 'CA' in 2013. Then, given that all orders are from 2013, this query will return 0 rows. But, unless the system knows about this (negative) correlation at compile time, range-based pruning will not help in this scenario because there is no range predicate on order_date given by the user.

On the other hand, the technology of the disclosure will read the commercial table, find that all commercials with state='CA' fall outside the range ('01-JAN-2013', '31-DEC-2013'), store this fact in a 'RangeBloomvec' data structure, and can then use this data structure to perform dynamic pruning on the orders table. In this extreme case, no files/blocks from the orders table are ever read.

It should be noted that the structure of the query plan and data and execution flow is the same as, or similar to, existing methods, and, as such, the range bloom vector idea and the related range bloom filter and range bloom pruning techniques applied to existing implementations of bloom filtering and bloom pruning are considered to fall within the scope of this disclosure.

Figure 3:
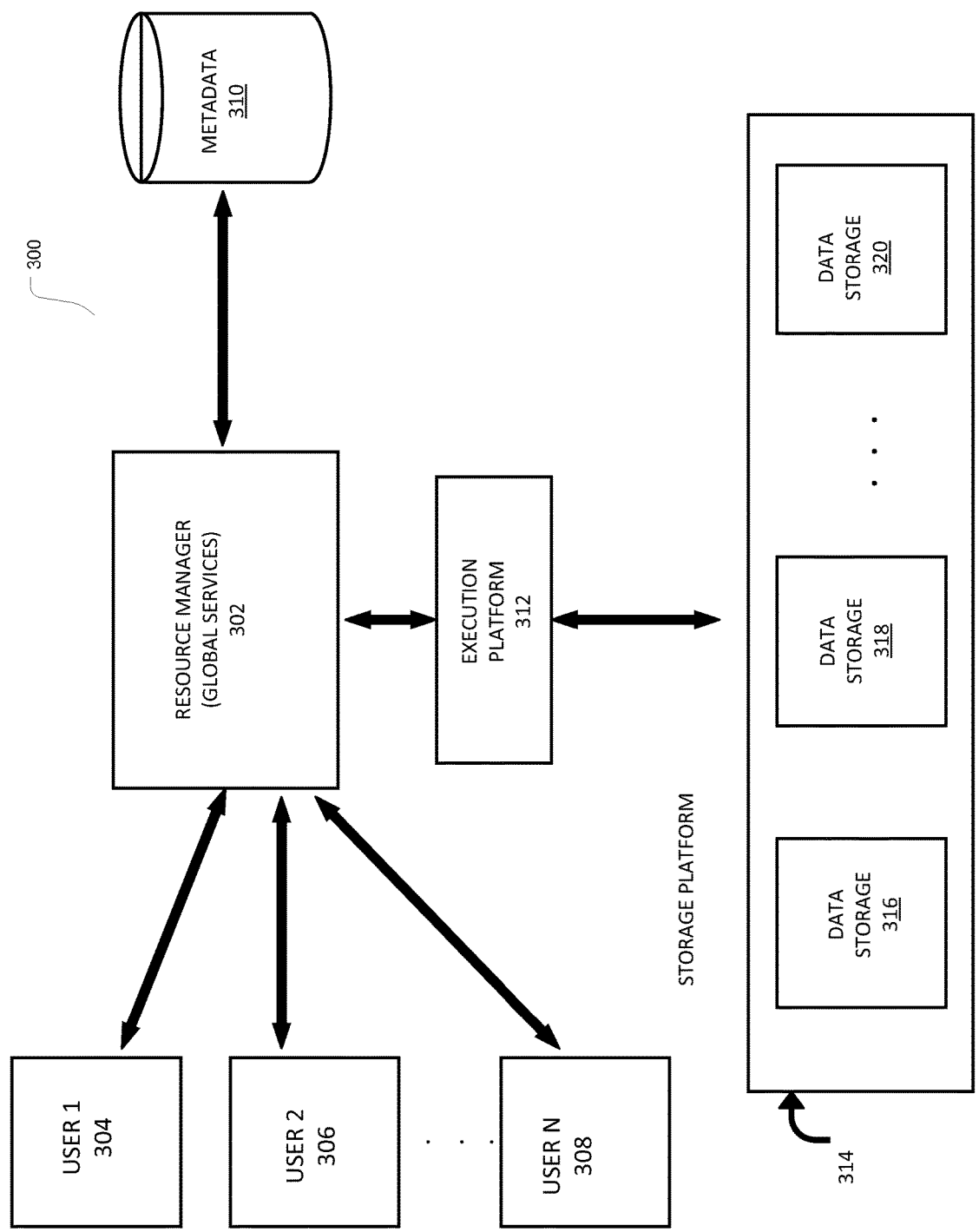
FIG. 3 illustrates a block diagram depicting an embodiment of an operating environment in accordance with the teachings of the disclosure.

Illustrated in FIG. 3 is a computer system for running the methods disclosed herein. As shown in FIG. 3, a resource manager 302 is coupled to multiple users 304, 306, and 308. In particular implementations, resource manager 302 can support any number of users desiring access to data processing platform 300. Users 304-308 may include, for example, end users providing data storage and retrieval requests, system administrators managing the systems and methods described herein, and other components/devices that interact with resource manager 302. Resource manager 302 provides various services and functions that support the operation of all systems and components within data processing platform 300. Resource manager 302 is also coupled to metadata 310, which is associated with the entirety of data stored throughout data processing platform 300. In some embodiments, metadata 310 includes a summary of data stored in remote data storage systems as well as data available from a local cache. Additionally, metadata 310 may include information regarding how data is organized in the remote data storage systems and the local caches. Metadata 310 allows systems and services to determine whether a piece of data needs to be processed without loading or accessing the actual data from a storage device.

Resource manager 302 is further coupled to an execution platform 312, which provides multiple computing resources that execute various data storage and data retrieval tasks, as discussed in greater detail below. Execution platform 312 is coupled to multiple data storage devices 316, 318, and 320 that are part of a storage platform 314. Although three data storage devices 316, 318, and 320 are shown in FIG. 3, execution platform 312 is capable of communicating with any number of data storage devices. In some embodiments, data storage devices 316, 318, and 320 are cloud-based storage devices located in one or more geographic locations. For example, data storage devices 316, 318, and 320 may be part of a public cloud infrastructure or a private cloud infrastructure. Data storage devices 316, 318, and 320 may be hard disk drives (HDDs), solid state drives (SSDs), storage clusters or any other data storage technology. Additionally, storage platform 314 may include distributed file systems (such as Hadoop Distributed File Systems (HDFS)), object storage systems, and the like.

In particular embodiments, the communication links between resource manager 302 and users 304-308, metadata 310, and execution platform 312 are implemented via one or more data communication networks. Similarly, the communication links between execution platform 312 and data storage devices 316-320 in storage platform 314 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 3, data storage devices 316, 318, and 320 are decoupled from the computing resources associated with execution platform 312. This architecture supports dynamic changes to data processing platform 300 based on the changing data storage/retrieval needs as well as the changing needs of the users and systems accessing data processing platform 300. The support of dynamic changes allows data processing platform 300 to scale quickly in response to changing demands on the systems and components within data processing platform 300. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Resource manager 302, metadata 310, execution platform 312, and storage platform 314 are shown in FIG. 3 as individual components. However, each of resource manager 302, metadata 310, execution platform 312, and storage platform 314 may be implemented as a distributed system (e.g., distributed across multiple systems/platforms at multiple geographic locations). Additionally, each of resource manager 302, metadata 310, execution platform 312, and storage platform 314 can be scaled up or down (independently of one another) depending on changes to the requests received from users 304-308 and the changing needs of data processing platform 300. Thus, in the described embodiments, data processing platform 300 is dynamic and supports regular changes to meet the current data processing needs.

Figure 4:
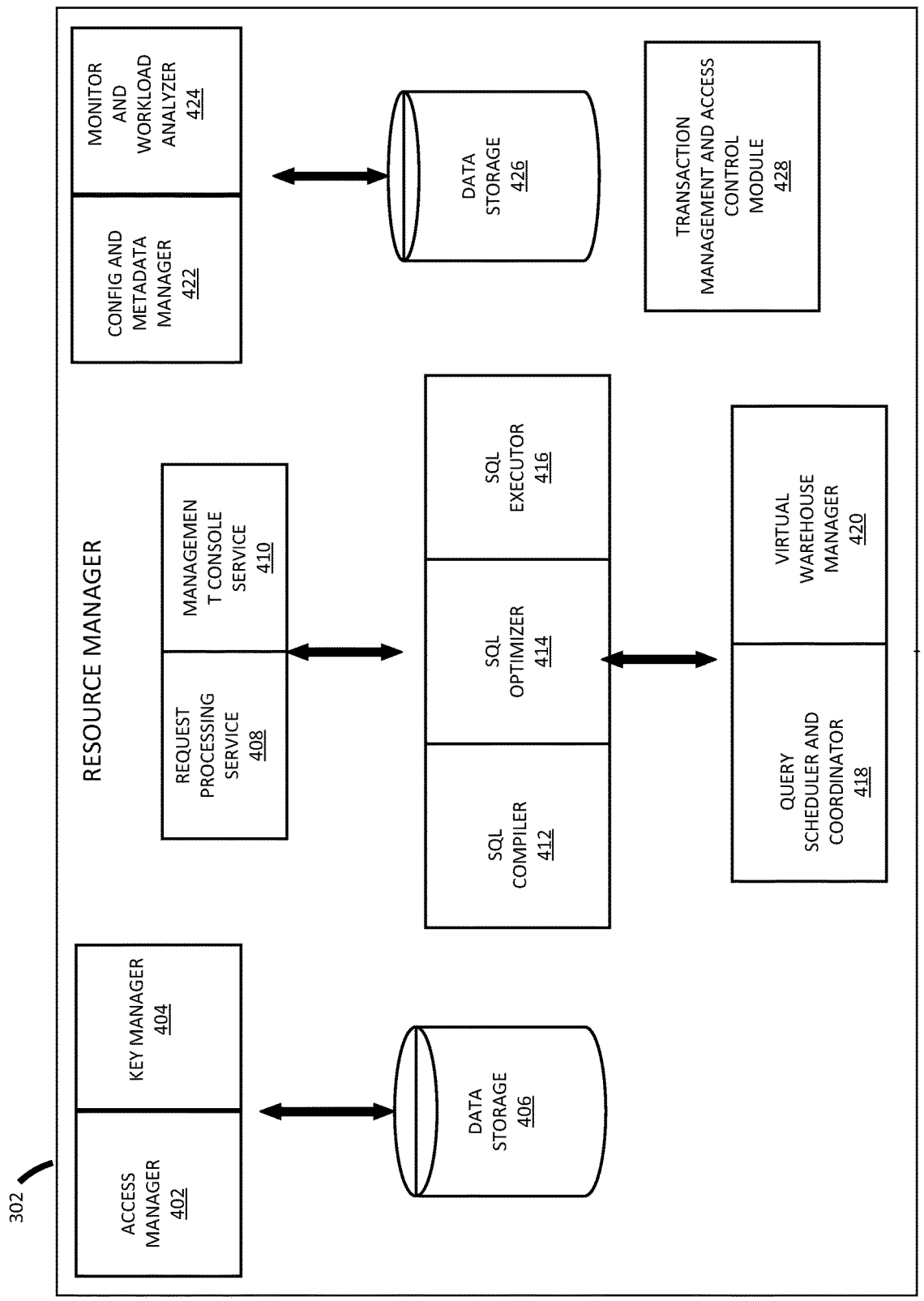
FIG. 4 illustrates a block diagram depicting an example of an implementation of a resource manager in accordance with the teachings of the disclosure.

FIG. 4 is a block diagram depicting an embodiment of resource manager 302. As shown in FIG. 3, resource manager 302 includes an access manager 402 and a key manager 404 coupled to a data storage device 406. Access manager 402 handles authentication and authorization tasks for the systems described herein. Key manager 404 manages storage and authentication of keys used during authentication and authorization tasks. A request processing service 408 manages received data storage requests and data retrieval requests. A management console service 410 supports access to various systems and processes by administrators and other system managers.

Resource manager 302 also includes an SQL compiler 412, an SQL optimizer 414 and an SQL executor 410. SQL compiler 412 parses SQL queries and generates the execution code for the queries. SQL optimizer 414 determines the best method to execute queries based on the data that needs to be processed. SQL executor 416 executes the query code for queries received by resource manager 302. A query scheduler and coordinator 418 sends received queries to the appropriate services or systems for compilation, optimization, and dispatch to an execution platform. A virtual warehouse manager 420 manages the operation of multiple virtual warehouses implemented in an execution platform.

Additionally, resource manager 302 includes a configuration and metadata manager 422, which manages the information related to the data stored in the remote data storage devices and in the local caches. A monitor and workload analyzer 424 oversees the processes performed by resource manager 302 and manages the distribution of tasks (e.g., workload) across the virtual warehouses and execution nodes in the execution platform. Configuration and metadata manager 422 and monitor and workload analyzer 424 are coupled to a data storage device 426.

Resource manager 302 also includes a transaction management and access control module 428, which manages the various tasks and other activities associated with the processing of data storage requests and data access requests. For example, transaction management and access control module 428 provides consistent and synchronized access to data by multiple users or systems. Since multiple users/systems may access the same data simultaneously, changes to the data must be synchronized to ensure that each user/system is working with the current version of the data. Transaction management and access control module 428 provides control of various data processing activities at a single, centralized location in resource manager 302.

Figure 5:
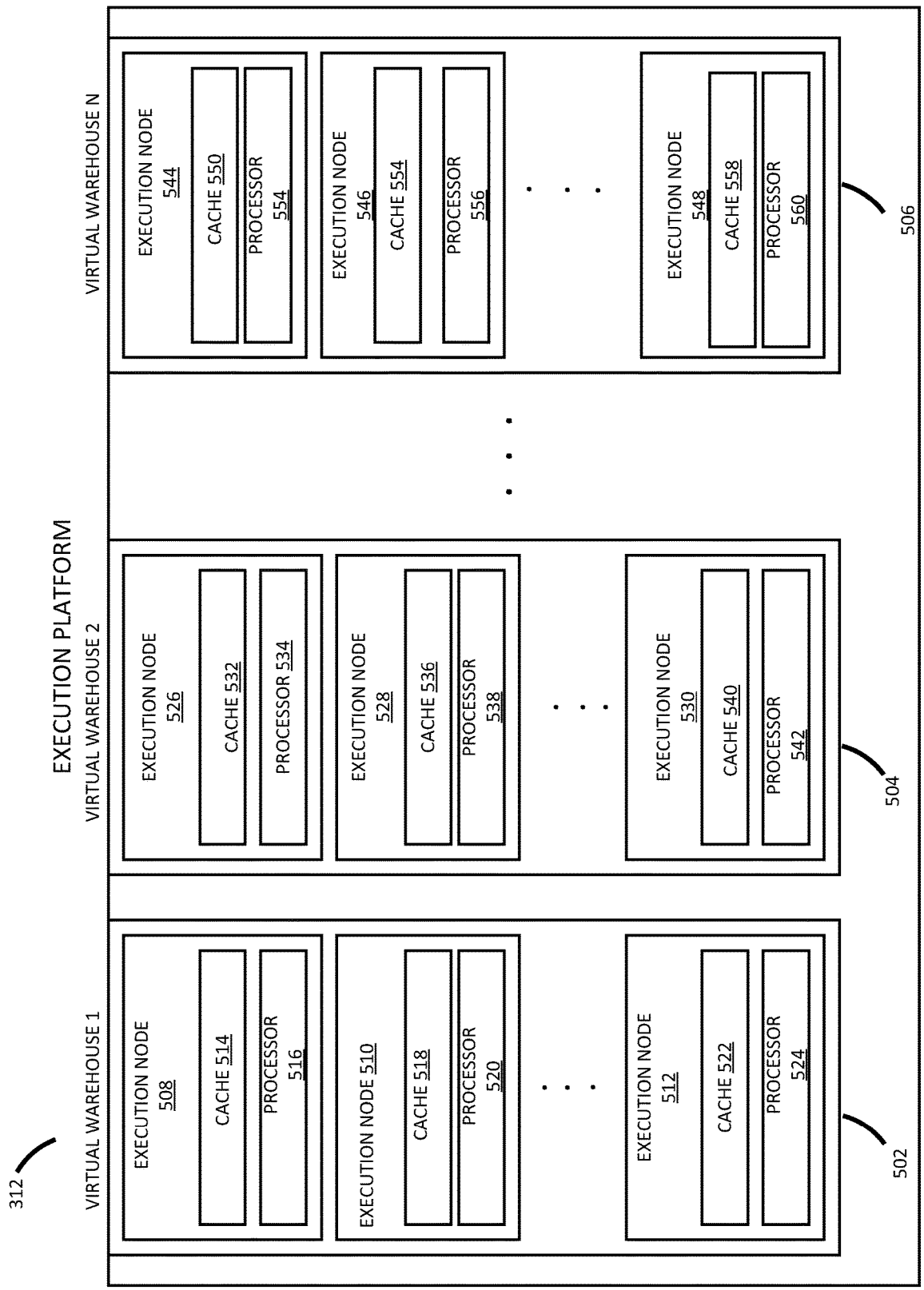
FIG. 5 illustrates a block diagram depicting an example of an implementation of a execution platform in accordance with the teachings of the disclosure.

FIG. 5 is a block diagram depicting an embodiment of an execution platform. As shown in FIG. 5, execution platform 512 includes multiple virtual warehouses 502, 504, and 506. Each virtual warehouse includes multiple execution nodes that each include a cache and a processor. Although each virtual warehouse 502-506 shown in FIG. 5 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse 502-506 is capable of accessing any of the data storage devices 316-320 shown in FIG. 3. Thus, virtual warehouses 502-506 are not necessarily assigned to a specific data storage device 316-320 and, instead, can access data from any of the data storage devices 316-320. Similarly, each of the execution nodes shown in FIG. 5 can access data from any of the data storage devices 316-320. In some embodiments, a particular virtual warehouse or a particular execution node may be temporarily assigned to a specific data storage device, but the virtual warehouse or execution node may later access data from any other data storage device.

In the example of FIG. 5, virtual warehouse 502 includes three execution nodes 508, 510, and 512. Execution node 508 includes a cache 514 and a processor 516. Execution node 510 includes a cache 518 and a processor 520. Execution node 512 includes a cache 522 and a processor 524. Each execution node 508-512 is associated with processing one or more data storage and/or data retrieval tasks. For example, a particular virtual warehouse may handle data storage and data retrieval tasks associated with a particular user or customer. In other implementations, a particular virtual warehouse may handle data storage and data retrieval tasks associated with a particular data storage system or a particular category of data.

Similar to virtual warehouse 502 discussed above, virtual warehouse 504 includes three execution nodes 526, 528, and 530. Execution node 526 includes a cache 532 and a processor 534. Execution node 528 includes a cache 536 and a processor 538. Execution node 530 includes a cache 540 and a processor 542. Additionally, virtual warehouse 506 includes three execution nodes 544, 546, and 548. Execution node 544 includes a cache 550 and a processor 552. Execution node 546 includes a cache 554 and a processor 556. Execution node 548 includes a cache 558 and a processor 560.

Although the execution nodes shown in FIG. 5 each include one cache and one processor, alternate embodiments may include execution nodes containing any number of processors and any number of caches. Additionally, the caches may vary in size among the different execution nodes. The caches shown in FIG. 5 store, in the local execution node, data that was retrieved from one or more data storage devices in a storage platform 314 (FIG. 3). Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in storage platform 314.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, a particular execution node may be assigned more processing resources if the tasks performed by the execution node become more processor intensive. Similarly, an execution node may be assigned more cache resources if the tasks performed by the execution node require a larger cache capacity.

Although virtual warehouses 502-506 are associated with the same execution platform 312 of FIG. 3, the virtual warehouses may be implemented using multiple computing systems at multiple geographic locations. For example, virtual warehouse 502 can be implemented by a computing system at a first geographic location, while virtual warehouses 504 and 506 are implemented by another computing system at a second geographic location. In some embodiments, these different computing systems are cloud-based computing systems maintained by one or more different entities.

Additionally, each virtual warehouse is shown in FIG. 5 as having multiple execution nodes. The multiple execution nodes associated with each virtual warehouse may be implemented using multiple computing systems at multiple geographic locations. For example, a particular instance of virtual warehouse 502 implements execution nodes 508 and 510 on one computing platform at a particular geographic location, and implements execution node 512 at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse. Execution platform 312 is also fault tolerant. For example, if one virtual warehouse fails, that virtual warehouse is quickly replaced with a different virtual warehouse at a different geographic location.

A particular execution platform 312 may include any number of virtual warehouses 502-506. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

Figure 6:
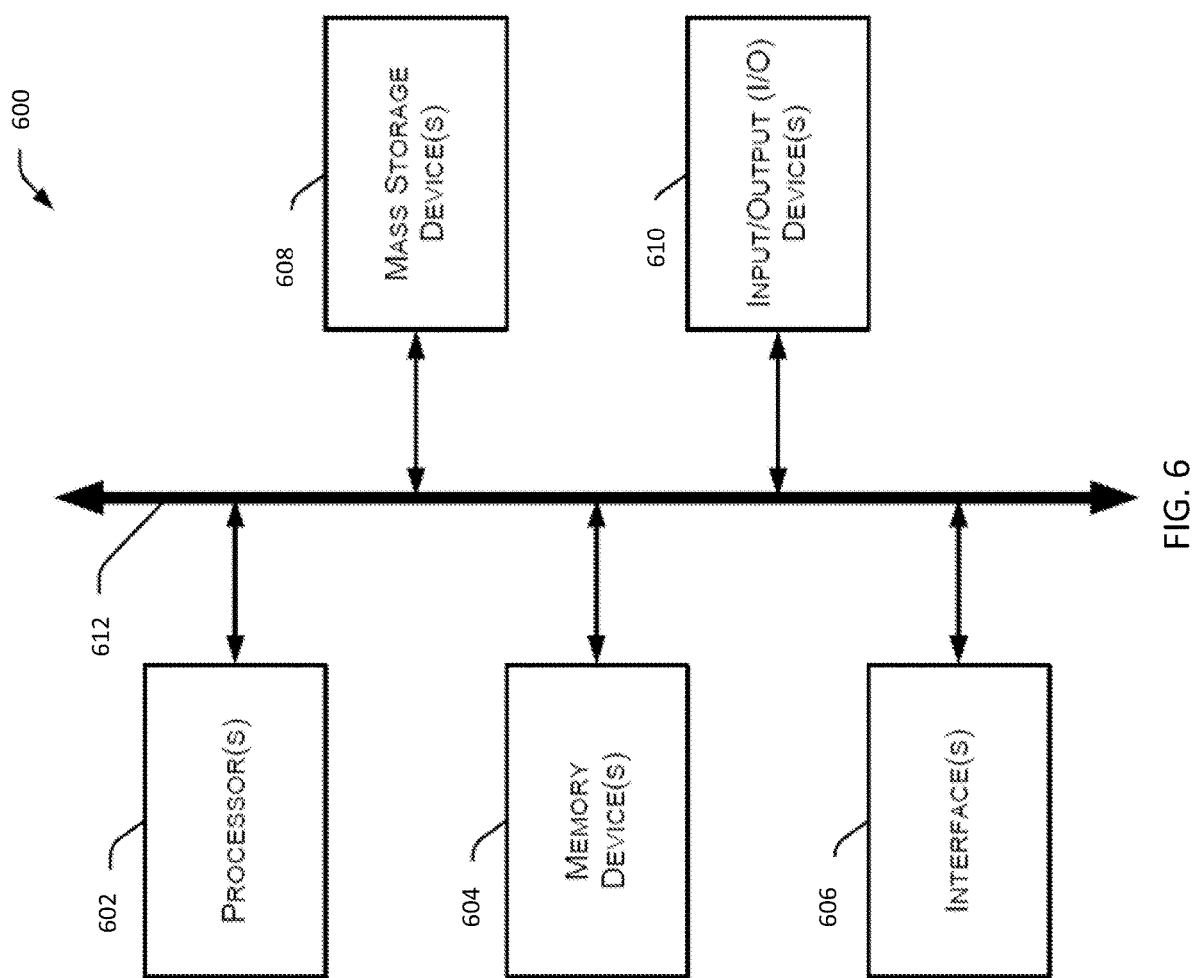
FIG. 6 illustrates a block diagram depicting an example computing device in accordance with the teachings of the disclosure.

FIG. 6 is a block diagram depicting an example computing device 600. In some embodiments, computing device 600 is used to implement one or more of the systems and components discussed herein. For example, computing device 600 may allow a user or administrator to access resource manager 302. Further, computing device 600 may interact with any of the systems and components described herein. Accordingly, computing device 600 may be used to perform various procedures and tasks, such as those discussed herein. Computing device 600 can function as a server, a client or any other computing entity. Computing device 600 can be any of a wide variety of computing devices, such as a desktop computer, a notebook computer, a server computer, a handheld computer, a tablet, and the like.

Computing device 600 includes one or more processor(s) 602, one or more memory device(s) 604, one or more interface(s) 606, one or more mass storage device(s) 608, and one or more Input/Output (I/O) device(s) 610, all of which are coupled to a bus 612. Processor(s) 602 include one or more processors or controllers that execute instructions stored in memory device(s) 604 and/or mass storage device(s) 608. Processor(s) 602 may also include various types of computer-readable media, such as cache memory.

Memory device(s) 604 include various computer-readable media, such as volatile memory (e.g., random access memory (RAM)) and/or nonvolatile memory (e.g., read-only memory (ROM)). Memory device(s) 604 may also include rewritable ROM, such as Flash memory.

Mass storage device(s) 608 include various computer readable media, such as magnetic tapes, magnetic disks, optical disks, solid state memory (e.g., Flash memory), and so forth. Various drives may also be included in mass storage device(s) 608 to enable reading from and/or writing to the various computer readable media. Mass storage device(s) 608 include removable media and/or non-removable media.

I/O device(s) 610 include various devices that allow data and/or other information to be input to or retrieved from computing device 600. Example I/O device(s) 610 include cursor control devices, keyboards, keypads, microphones, monitors or other display devices, speakers, printers, network interface cards, modems, lenses, CCDs or other image capture devices, and the like.

Interface(s) 606 include various interfaces that allow computing device 600 to interact with other systems, devices, or computing environments. Example interface(s) 606 include any number of different network interfaces, such as interfaces to local area networks (LANs), wide area networks (WANs), wireless networks, and the Internet.

Bus 612 allows processor(s) 602, memory device(s) 604, interface(s) 606, mass storage device(s) 608, and I/O device(s) 610 to communicate with one another, as well as other devices or components coupled to bus 612. Bus 612 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 600, and are executed by processor(s) 602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the term "module" is intended convey the implementation apparatus for accomplishing a process, such as by hardware, or a combination of hardware, software, and/or firmware.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:
   storing a plurality of metadata items in a metadata store that is separate from a storage platform that stores a plurality of files, each file of the plurality of files comprising a block of database data;
   determining a join operation to be performed on two or more files of the plurality of files, the join operation comprising a predicate indicating a first value;
   scanning the plurality of metadata items without accessing the database data to identify the two or more files that are necessary to complete the join operation, wherein:
      each metadata item corresponds to and comprises information about a file of the plurality of files; and
      each metadata item indicates a minimum/maximum value range for its corresponding file;
   identifying, from the plurality of metadata items, a first group of files whose minimum/maximum value ranges do not encompass the first value;
   pruning the first group of files;
   consuming, by a build operator of the join operation, database data in at least one file of the two or more files that are necessary to complete the join operation;
   generating a vector summarizing the database data consumed by the build operator;
   broadcasting the vector to at least one probe operator of the join operation; and
   filtering rows from the one or more files that are necessary to complete the join operation based on the vector.

2. The method of claim 1, wherein the build operator is configured to build a hash table as part of the join operation and wherein the probe operator is configured to read streams of database data and probe the hash table to find matching rows as part of the join operation.

3. The method of claim 2, wherein the build operator is configured to build the hash table and further generate the vector.

4. The method of claim 1, wherein the vector holds a minimum and maximum value pair that describes a range of values present in the database data consumed by the build operator.

5. The method of claim 1, wherein pruning the first group of files comprises removing the first group of files from the join operation such that the first group of files is are not consumed by any build operator of the join operation.

6. The method of claim 1, wherein the vector is a bounded size hash map describing a range of values consumed by the build operator such that ranges of individual hash map entries are disjunct.

7. The method of claim 1, wherein the vector comprises a range bloom vector and is configured for gathering and querying information on value ranges using only a constant amount of memory.

8. The method of claim 1, further comprising inputting the vector into a corresponding local filter operator, wherein the local filter operator is a local access path to a second relation of the join operation.

9. The method of claim 1, wherein the determining the join operation comprises receiving a query comprising the predicate, wherein execution of the join operation is required to respond to the query.

10. A system comprising:
    a memory to store one or more processing instructions;
    a processing device, operatively coupled to the memory, to:
       store a plurality of metadata items in a metadata store that is separate from a storage platform that stores a plurality of files, each file of the plurality of files comprising a block of database data;
       determine a join operation to be performed on two or more files of the plurality of files, the join operation comprising a predicate indicating a first value;
       scan the plurality of metadata items without accessing the database data to identify the two or more files that are necessary to complete the join operation, wherein:
          each metadata item corresponds to and comprises information about a file of the plurality of files; and
          each metadata item corresponding metadata for a file indicates a minimum/maximum value range for its corresponding file;
       prune the first group of files;
       consume, by a build operator of the join operation, database data in at least one file of the one or more files that are necessary to complete the join operation;

generate a vector summarizing the database data consumed by the build operator;
broadcast the vector to at least one probe operator of the join operation; and
filter rows from the one or more files that are necessary to complete the join operation based on the vector.

11. The system of claim 10, the processing device further to:
build a hash table as part of the join operation, and
probe the hash table to find matching rows as part of the join operation.

12. The system of claim 11, wherein the build operator builds the hash table and generates the vector.

13. The system of claim 10, wherein the vector holds a minimum and maximum value pair that describes a range of values present in the database data consumed by the build operator.

14. The system of claim 10, the processing device further to remove the first group of files from the join operation such that the first group of files are not consumed by any build operator of the join operation.

15. The system of claim 10, wherein the vector is a bounded size hash map describing a range of values consumed by the build operator such that ranges of individual hash map entries are disjunct.

16. The system of claim 10, wherein the vector comprises a range bloom vector, wherein the range bloom vector gathers and queries information on value ranges using only a constant amount of memory.

17. The system of claim 10, the processing device further to input the vector into a corresponding local filter operator, wherein the local filter operator is a local access path to a second relation of the join operation.

18. Non-transitory computer readable storage media storing instructions that, when executed by one or more processors, cause the one or more processors to:
store a plurality of metadata items in a metadata store that is separate from a storage platform that stores a plurality of files, each file of the plurality of files comprising a block of database data;
determine a join operation to be performed on two or more files of the plurality of files, the join operation comprising a predicate indicating a first value;
scan the plurality of metadata items without accessing the database data to identify the two or more files that are necessary to complete the join operation, wherein:
each metadata item corresponds to and comprises information about a file of the plurality of files; and
each metadata item indicates a minimum/maximum value range for its corresponding file;
identify, from the plurality of metadata items, a first group of files whose minimum/maximum value ranges do not encompass the first value;
prune the first group of files;
consume, by a build operator of the join operation, database data in at least one file of the two or more files that are necessary to complete the join operation;
generate a vector summarizing the database data consumed by the build operator;
broadcast the vector to at least one probe operator of the join operation; and
filter rows from the one or more files that are necessary to complete the join operation based on the vector.

19. The non-transitory computer readable storage media of claim 18, wherein the build operator is configured to build a hash table as part of the join operation and wherein the probe operator is configured to read streams of database data and probe the hash table to find matching rows as part of the join operation.

20. The non-transitory computer readable storage media of claim 19, wherein the build operator is configured to build the hash table and further generate the vector.

21. The non-transitory computer readable storage media of claim 18, wherein the vector holds a minimum and maximum value pair that describes a range of values present in the database data consumed by the build operator.

22. The non-transitory computer readable storage media of claim 18, wherein the instructions cause the one or more processors to prune the first group of files by removing the first group of files from the join operation such that the first group of files are not consumed by any build operator of the join operation.

23. The non-transitory computer readable storage media of claim 18, wherein the vector is a bounded size hash map describing a range of values consumed by the build operator such that ranges of individual hash map entries are disjunct.

24. The non-transitory computer readable storage media of claim 18, wherein the vector comprises a range bloom vector and is configured for gathering and querying information on value ranges using only a constant amount of memory.

25. The non-transitory computer readable storage media of claim 18, further comprising inputting the vector into a corresponding local filter operator, wherein the local filter operator is a local access path to a second relation of the join operation.

26. The non-transitory computer readable storage media of claim 18, wherein the determining the join operation comprises receiving a query comprising the predicate, wherein execution of the join operation is required to respond to the query.

* * * * *

UNITED STATES PATENT AND TRADEMARK OFFICE
CERTIFICATE OF CORRECTION

PATENT NO. : 10,545,917 B2
APPLICATION NO. : 14/882024
DATED : January 28, 2020
INVENTOR(S) : Dageville et al.

It is certified that error appears in the above-identified patent and that said Letters Patent is hereby corrected as shown below:

In the Claims

In Column 16, Line 25, after "is" please delete "are"

In Column 16, Line 61, after "each metadata item" please delete "corresponding metadata for a file"

In Column 17, Line 9, please delete "operation," and insert --operation;--

Signed and Sealed this
Twenty-eighth Day of June, 2022

Katherine Kelly Vidal
*Director of the United States Patent and Trademark Office*